July 14, 1942.  A. E. RAIA  2,289,518
SHAVING HEAD FOR DRY SHAVERS
Filed Dec. 3, 1938
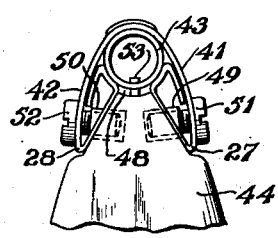
Fig. 1
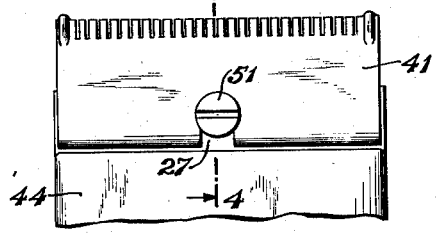
Fig. 2
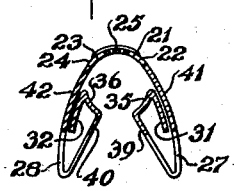
Fig. 4
Fig. 3
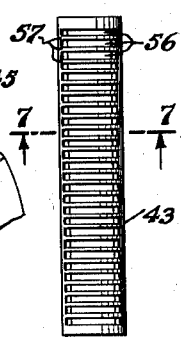
Fig. 6 Fig. 5
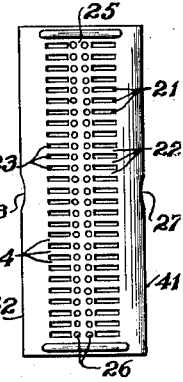
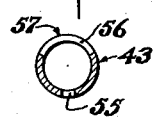
Fig. 7
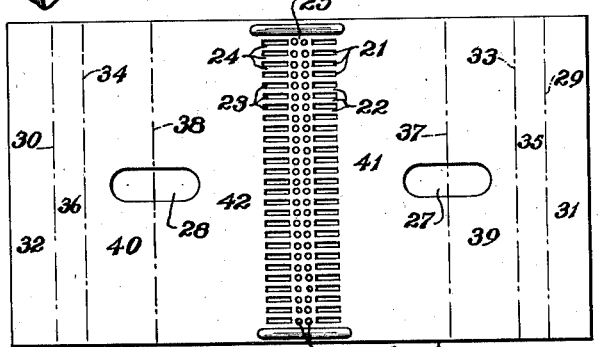
Fig. 8
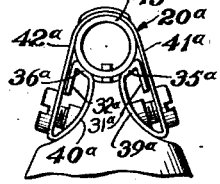
Fig. 10
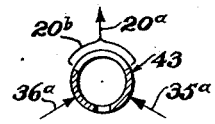
Fig. 9
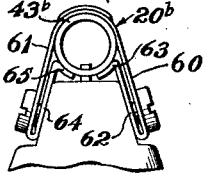
Fig. 11
INVENTOR
Alfred E. Raia Patented July 14, 1942

2,289,518

UNITED STATES PATENT OFFICE 2,289,518

SHAVING HEAD FOR DRY SHAVERS

Alfred E. Raia, New York, N. Y., assignor to Remington Rand Inc., Buffalo, N. Y., a corporation of Delaware Application December 3, 1938, Serial No. 243,704

6 Claims. (Cl. 30—43)

This invention relates to improvements in shaving heads for dry shavers, and has for an object the provision of a shaving head comprising a thin shear plate having formed therein groups of perforations defining cutting zones adapted to cooperate with an inner movable cutter, and also having formed integrally therewith resilient means to urge said cutter against said cutting zones. By this new and improved arrangement, the use of springs, spring-loaded balls or plungers such as have been employed in the prior art, are eliminated, and at the same time an additional advantage is obtained due to the fact that said resilient means exerts an evenly distributed pressure upon the movable cutter throughout the length of the cutter, thereby insuring intimate contact between the webs of said perforations and the movable cutter.

Another object of the invention is the provision in a shearing device of a shearing head which carries in cooperative relation therewith an inner movable cutter member, said shearing head not only forming the sole support of said cutter member but also serving to maintain said cutter member in intimate contact in a definite zone within said shaving head throughout the length thereof.

In some types of dry shavers of the prior art the cutter bars in the outer guard are so thin as to be incapable of self-support and are therefore supported by a cutter member suitably backed up by set screws. An object of the present invention is the provision of a shearing head which of itself supports the cutter bars.

A further object of the invention is the provision of a shearing head which may be formed of a single stamping or a blank which after blanking is formed up to make a complete shearing head which not only includes cutter members but also includes portions which engage and resiliently maintain the cutter bars of a movable cutter in intimate contact with the cutter members of said head. This is believed to be of substantial commercial value due to the fact that a single piece takes the place of a plurality of parts, lending itself to economy of manufacture especially in quantity production.

A still further object of the invention is the provision in a dry shaver of a shear plate which includes means formed integral therewith for yieldably engaging and holding within itself a movable cutter bar, thereby eliminating springs and plungers such as are employed in many devices of the prior art.

Still another object is the provision in a dry shaver of a handle carrying a motor and having one end thereof preformed to support the improved type of shear plate and having projecting therefrom an arm driven by the motor and forming the only member carried by said handle and coming in contact with the movable cutter bar.

Still another object of the invention is the provision in a dry shaver of a motor casing forming the handle of said shaver and having one end thereof pre-formed to conform to the shape of the cutting head of said shaver, including screw lugs one on either side and positioned within the area shaped to conform to said cutting head, a cutter for said cutting head, and a driving member extending from the end of said casing and forming the only portion of said casing in contact with said cutter member.

A further object of the invention is the provision in a dry shaver of an outer guard or shear plate blanked from sheet material and folded up in such a manner as to resiliently engage and support within itself, an inner movable cutter.

Other objects will be apparent to those skilled in the art.

Referring to the drawing:

Figure 1 is an end view of a shaving device employing the new and improved shear plate, a portion of the motor casing or handle being broken away;

Figure 2 is a side elevation of the device shown in Figure 1;

Figure 3 is a perspective view of the end of the motor casing showing the end portion preformed to member up with the new and improved shear plate or guard, and showing the motor driven arm which engages a slot in the movable cutter member when the shear plate and its movable cutter member are mounted on the end of the motor casing;

Figure 4 is a cross sectional view of the shear plate alone, taken along the line 4—4 of Figure 2;

Figure 5 is a plan view of the new and improved shear plate as viewed from above in Figure 4;

Figure 6 is a view of one form of the movable inner cutter member;

Figure 7 is a sectional view taken along the line 7—7 of Figure 6;

Figure 8 is a view showing the shear plate blanked out before it has been formed;

Figure 9 is a force diagram showing the resilient pressure exerted upon the inner cutter member by the new and improved shear plate and the resultant cutting area or zone in which the inner shearing member is maintained in intimate contact with the inner surface of the shear plate;

Figure 10 is an end elevation showing a modified form of the new and improved shear plate shown in Figure 1; and Figure 11 is an end view illustrating a further modification of the new and improved shear plate shown in Figure 1.

Referring first to Figure 8, the new and improvide shear plate, generally designated by the numeral 20, has formed therein a series of perforations 21, with webs 22 therebetween which form with the inner cutter member, to be presently described, shearing edges. Spaced apart from the series of perforations is a second series of perforations 23 having webs 24 therebetween also forming shearing edges. The space area between the two series of perforations is designated by the numeral 25. This space may be left solid, or it may be provided with one or more series of perforations 26.

The perforations 26, although shown as circular, may be of any other desired shape or form. In some instances the space 25 may be omitted, thereby joining the series of perforations 21 and 23 to form a single series. The blank 20 also contains an oblong perforation 27 spaced apart from and to one side of the series 21; and a like oblong perforation 28 to one side of and spaced apart from the series 23.

The blank 20 may be folded in any desired manner to form a shear plate of the character described. For example, the ends of the plate (Figure 8) may be bent downwardly along the dot-dash lines 29 and 30, and at the same time curved so as to form the portions 31 and 32 shown in Figure 4. The remaining end portions of the plate 20 (Figure 8) may be bent downwardly along the dot-dash lines 33 and 34, to form the areas designated by the numerals 35 and 36 (Figure 4) forming cutter guide sections. Thereafter the plate 20 is bent downwardly along the dot-dash lines 37 and 38, to form the portions 39 and 40 shown in Figure 4 providing guide supporting sections. The area between the dot-dash line 37 and the series of perforations 22 is designated in Figure 4 by the numeral 41; and the area between the dot-dash line 38 and the series of perforations 23 is designated by the numeral 42 the areas 41 and 42 constituting side sections while the portion provided with perforations 22 constitutes the shaving section.

The portions or areas 35 and 36 are curved to conform to the shape of the inner cutter memmer 43 and form cutter guide sections. In some instances, the curved portions 35 and 36, together with the inner surface of the perforated portion may be slightly smaller in diameter than the diameter of the inner cutter member after forming, and may thereafter be ground out to more accurately conform to the diameter of the inner cutter member 43.

It will be noted that a slight gap appears between the outer surface of the portion 31 and the portion 41 and between the portion 32 and the portion 42. When the cutter member 43 is normally positioned within the shear plate, the curved portions 35 and 36 forming the cutter guide sections bear against the cutter member in areas below the horizontal center line exerting an even pressure throughout the length of the cutter on each side, and the result of these two forces is that the inner cutter member 43 is hold in intimate contact with the inner surface of the perforated portions of the shear plate, as will presently be described in connection with the diagram, Figure 9.

The motor housing or handle 44 has its upper end pre-formed to provide a wedge-shaped support to conform to the shape of the new and improved shear plate. For example, the surface 45 is adapted to have the surface 39 of the share plate engaged therewith and the surface 46 is adapted to engage the portion 40 of the shear plate. The area 47 clears the cutter member 43, a space 48 being left therebetween.

The surface 45 has a hollow threaded insert 49 preferably moulded in and adapted to be engaged by the slot 27, and likewise the surface 46 has a hollow threaded insert 50 preferably moulded in and adapted to be engaged by the slot 28.

The screw 51 screwed into the threaded bushing 49 has its head engaging the outer surface of the shear plate in an area adjacent to the slot 27, and a like screw 52 screwed into the bushing 50 has its head engaging an area adjacent to the slot 28.

By means of the screws 51 and 52, the tension or resilient force of the surfaces 35 and 36 against the cutter member may be to some degree regulated.

From this it may be seen that the cutter member 43 is entirely supported by the shear plate structure. A driving arm 53 extending through the slot 54 in the end of the motor housing engages a slot 55 formed in the inner cutter member 43. The arm 53 is oscillated by the motor, and in turn said arm reciprocates the cutter member 43 within the new and improved shear plate 20.

The inner cutter member, shown in Figures 6 and 7, consists of a tube 43 having a plurality of slots 56 having webs 57 therebetween forming shearing edges cooperating with the webs 24 in the shear plate when the device is assembled. As described above, a slot 55 is formed in the tube 43 at substantially the mid-portion thereof opposite the slots 56. For instance, this may be seen in Figure 7, the slot being provided to be engaged by the driving arm 53.

The new and improved shear plate, in addition to forming the sole support for the inner cutter member 43, also exerts pressure against the inner cutter member 43. For example, referring to Figure 9, the surface 35 exerts force against the inner cutter member in an area which is centrally indicated by means of the arrow 35a. Likewise, the force exerted by the portion 36 of the shear plate is designated by the arrow 36a. The resultant of these two forces against the inner surface of the active area of the shear plate is indicated as centering in the direction of the arrow 20a, and thereby the surface of the inner cutter member 43 is in intimate contact with the inner surface of the shear plate, in so far as the inner cutter member is concerned, throughout the arc designated by the bracket 20b.

Due to the fact that the pressure exerted by the portions 35 and 36 is not only circumferential, as indicated in Figure 9, but is also longitudinal throughout the length of the cutter member 43, shearing occurs throughout the length of the series of perforations 21, 23 and 26, thereby insuring fast shearing and no pulling of hairs.

In the modification shown in Figure 10, the shear plate 20A having portions 41A, 42A, 39A, 40A, corresponding to the portions 41, 42, 39 and 40, respectively, of Figure 4, also has portions 35A, 36A, formed to contact the inner cutter member 43A at points nearer to the vertical center line thereof, the resultant of forces of which will also maintain the active area of the inner cutter member 43A in intimate contact with the webs of the perforations formed in the shear plate 20A. The portions 31A and 32A are respectively slightly spaced apart from the portions 41A and 42A, and the portions 39A and 40A may be curved, as shown, to lend pressure.

In the modification shown in Figure 11, the shear plate 20B, which may have a plurality of series of perforations similar to those shown in Figure 11, has side portions 60 and 61 corresponding to the side portions 41 and 42, respectively, in Figure 4. The side 60 has a portion 62 bent upwardly and substantially parallel to the portion 60 and having an extended portion 63 curvedly bent to conform to the shape of the inner cutter member 43B. The side 61 has a portion 64 bent upwardly and substantially parallel to the portion 61 and having an extended portion 65 curvedly bent to conform to the shape of the inner cutter member 43B. This type of construction, although somewhat simpler than that shown in Figure 4 or 10, performs the same functions as the devices shown in said figures, namely, that of wholly supporting the inner cutter member within itself and at the same time exerting pressure resiliently against the inner cutter member at points below the horizontal axis thereof.

Although several simple embodiments of the invention are herein shown and described, it is obvious that many changes may be made in the arrangement shown and described without departing from the spirit of the invention as defined in the annexed claims.

What is claimed is:

1. In a shaving device, a shear plate carrying a series of slots the edges of which form shearing members, a cylindrical cutter member carrying slots the edges of which form other cutting members adapted to cooperate with said first cutting members, the extremities of said shear plate being so formed that portions of their surfaces resiliently engage said cylindrical cutter member and maintain said shearing members in shearing relation with each other and means for adjusting the resilient engagement of said extremities with said cutter member.

2. A shaving head comprising an outer shear plate member formed of sheet metal to provide a central shaving section, said shaving section being formed to provide a plurality of shearing edges and including side sections extending from opposite sides of said shaving section to provide a shear plate construction of substantial U-shape in cross section, said member further including a cutter guide section and a guide supporting section carrying said cutter guide section and extending from the margin of a side section, and an inner cutter member engaged with the inner face of said shaving section having cutting edges formed on the portion engaging said shaving section, said inner cutter member having slidable bearing support on said cutter guide section, and said guide supporting section resiliently projecting and retaining said cutter guide section in engagement with said inner cutter member and resiliently retaining said inner cutter member in slidable engagement with said shaving section for cutting cooperation of said cutting edges in the reciprocation of said inner cutter on said shear plate.

3. A shaving head comprising an outer shear plate member formed of sheet metal to provide a central shaving section, said shaving section being formed to provide a plurality of cutting edges and including side sections extending from opposite sides of said shaving section in spaced relation to form a substantially U-shaped outer shear plate in cross section, said member further including a pair of cutter guide sections arranged in spaced relation between said side sections and disposed toward the inner face of said shaving section and guide supporting sections, each carrying one cutter guide section extending adjacent the inner face of one side section and connected to said side section at the free edge for resiliently supporting said cutter guide section in position to slidably receive and retain an inner cutter member in engagement with the inner surface of said shaving section for obtaining cutting cooperation of cutting edges on said inner cutter member with said cutting edges on said shear plate.

4. A shaving head comprising an outer shear plate member formed of sheet metal to provide a central shaving section formed to provide a plurality of shearing edges and including side sections extending from opposite sides of said shaving section to provide a shear plate construction of substantially U-shape in cross section, said member further including a cutter guide section spaced inwardly from the inner face of said shaving section in opposed relation thereto and a guide supporting section carrying said cutter guide section at one end and attached at the other end to the free margin of a side section, an inner cutter member slidably engaged between said cutter guide section and the inner face of said shaving section and having a plurality of cutting edges throughout the portion contacting said shaving section for cutting cooperation between said cutting and shearing edges in the reciprocation of said inner cutter member, said cutter guide being resiliently actuated through said guide supporting section to normally retain said inner cutter member in cooperative cutting engagement with said shaving section, and means for adjusting the resilient tension applied to said inner cutter member by said cutter guide section.

5. A shaver comprising a housing having an end formed to provide a wedge-shaped support, an outer shear plate member formed of sheet metal to provide a central shaving section having a plurality of shearing edges and including side sections extending from opposite sides of said shaving section to provide a shear plate construction of substantially U-shape in cross section, said member further including a cutter guide section spaced inwardly from the inner face of said shaving section in opposed relation thereto and a guide supporting section carrying said cutter guide section at one end and attached at the other end to the free margin of a side section, said guide supporting section extending in spaced relation between said side sections, an inner cutter member slidably engaged between said cutter guide section and the inner face of said shaving section and having a plurality of cutting edges throughout the portion contacting said shaving section for cutting cooperation between said cutting and shearing edges in the reciprocation of said inner cutter member, said cutter guide being resiliently actuated through said guide supporting section to normally retain said inner cutter member in cooperative cutting engagement with said shaving section, said shear plate having the side sections straddling said wedge-shaped support with said guide supporting section engaging said support, and means for retaining said shear plate in attached relation on said support and for also varying the resilient tension applied to said inner cutter member.

6. A shaving head comprising an outer shear plate member formed of sheet metal having a central partially cylindrical shaving section formed to provide a plurality of shearing edges and including side sections extending from opposite sides of said shaving sections to provide a shear plate construction of substantially U-shape in cross section, said member further including a cutter guide section between said side sections in spaced opposed relation to the inner face of said central shaving section in opposed relation thereto and a guide supporting section carrying said cutter guide section at one end and attached at the other end to the free margin of a side section, an inner tubular cutter member having a partially cylindrical section formed to provide a plurality of cutting edges, said portion of said inner cutter member having slidable engagement with the inner face of said shaving section for cutting cooperation between the cutting and shearing edges on said inner cutter member and shaving section respectively, said cutter guide section engaging a portion of said inner cutter member at a position substantially opposite to the engagement of said inner cutter member with said shaving section, and said guide supporting section resiliently actuating said cutter guide section and inner cutter member to maintain cutting cooperation of said inner cutter member with said shaving section in the reciprocation of said inner cutter member.

ALFRED E. RAIA.